(12) United States Patent
Makwinski et al.

(10) Patent No.: US 10,804,739 B2
(45) Date of Patent: Oct. 13, 2020

(54) WIRELESS POWER STATIONS

(71) Applicant: The Wiremold Company, West Hartford, CT (US)

(72) Inventors: Mark Makwinski, Cromwell, CT (US); Richard R. Picard, West Hartford, CT (US)

(73) Assignee: THE WIREMOLD COMPANY, West Hartford, CT (US)

( * ) Notice: Subject to any disclaimer, the term of this patent is extended or adjusted under 35 U.S.C. 154(b) by 0 days.

(21) Appl. No.: 15/843,034

(22) Filed: Dec. 15, 2017

(65) Prior Publication Data

US 2018/0109141 A1    Apr. 19, 2018

Related U.S. Application Data

(63) Continuation of application No. 14/637,036, filed on Mar. 3, 2015, now abandoned.

(60) Provisional application No. 61/947,178, filed on Mar. 3, 2014, provisional application No. 61/954,322, filed on Mar. 17, 2014, provisional application No. 61/981,982, filed on Apr. 21, 2014.

(51) Int. Cl.
| | | |
|---|---|---|
| *H02J 5/00* | (2016.01) | |
| *H02J 7/00* | (2006.01) | |
| *H02J 7/02* | (2016.01) | |
| *H02J 50/10* | (2016.01) | |
| *H02J 50/12* | (2016.01) | |
| *H02J 50/90* | (2016.01) | |
| *H02J 50/80* | (2016.01) | |
| *H02J 50/40* | (2016.01) | |

(52) U.S. Cl.
CPC ............ *H02J 50/10* (2016.02); *H02J 7/02* (2013.01); *H02J 50/12* (2016.02); *H02J 50/40* (2016.02); *H02J 50/80* (2016.02); *H02J 50/90* (2016.02)

(58) Field of Classification Search
CPC .. H02J 50/10; H02J 50/40; H02J 50/80; H02J 50/90; H02J 7/02; H02J 50/12; H02J 5/005; H02J 17/00; H02J 7/025
See application file for complete search history.

(56) References Cited

U.S. PATENT DOCUMENTS

| | | |
|---|---|---|
| 7,211,986 B1 | 5/2007 | Flowerdew et al. |
| 7,830,116 B2 | 11/2010 | Toya et al. |
| 7,908,978 B1 | 3/2011 | Pelton, Jr. |
| 7,952,322 B2 * | 5/2011 | Partovi .................. H01F 5/003 320/108 |

(Continued)

FOREIGN PATENT DOCUMENTS

JP    2012165553 A    8/2012

OTHER PUBLICATIONS

Supplementary European Search Report for Serial No. EP 15 85 5598 dated Mar. 15, 2018.

*Primary Examiner* — Kenneth B Wells
(74) *Attorney, Agent, or Firm* — McCormick, Paulding & Huber PLLC

(57) ABSTRACT

A power station includes a connection box with at least one receptacle and a wireless power transmitting assembly operatively connected to the connection box. The wireless power transmitting assembly is adapted to transfers wireless power. A power cord may be connected to the connection box to supply power to the connection box and the wireless power transmitting assembly.

20 Claims, 7 Drawing Sheets

(56) References Cited

U.S. PATENT DOCUMENTS

| | | | |
|---|---|---|---|
| 8,049,370 B2 * | 11/2011 | Azancot | H01F 38/14 307/104 |
| 8,210,708 B2 * | 7/2012 | Hau | H02J 50/10 362/183 |
| 8,228,026 B2 | 7/2012 | Johnson et al. | |
| 8,829,727 B2 * | 9/2014 | Urano | H02J 5/005 307/104 |
| 8,855,554 B2 * | 10/2014 | Cook | H02J 5/005 455/41.1 |
| 9,124,308 B2 * | 9/2015 | Metcalf | A47C 7/70 |
| 9,148,201 B2 * | 9/2015 | Kallal | H02J 5/005 |
| 9,184,632 B2 | 11/2015 | Kirby et al. | |
| 9,247,373 B2 | 1/2016 | Golsch | |
| 9,318,905 B2 | 4/2016 | Tsang | |
| 9,325,186 B2 | 4/2016 | Yang | |
| 9,438,070 B2 * | 9/2016 | Byrne | H02J 5/005 |
| 9,667,092 B2 * | 5/2017 | Miller | H02J 7/0054 |
| 9,793,738 B2 * | 10/2017 | Jacobs | H02J 5/005 |
| 10,381,880 B2 | 8/2019 | Leabman et al. | |
| 10,439,448 B2 | 10/2019 | Bell et al. | |
| 2004/0124164 A1 | 7/2004 | Perkins et al. | |
| 2005/0017677 A1 | 1/2005 | Burton et al. | |
| 2007/0287508 A1 | 12/2007 | Telefus | |
| 2008/0061733 A1 | 3/2008 | Toya | |
| 2009/0096413 A1 | 4/2009 | Partovi et al. | |
| 2009/0212638 A1 * | 8/2009 | Johnson | H02J 7/0044 307/104 |
| 2009/0212737 A1 | 8/2009 | Johnson et al. | |
| 2009/0218884 A1 | 9/2009 | Soar | |
| 2009/0243397 A1 | 10/2009 | Cook et al. | |
| 2009/0271642 A1 | 10/2009 | Cheng et al. | |
| 2009/0278493 A1 | 11/2009 | Alden | |
| 2009/0278505 A1 | 11/2009 | Toya et al. | |
| 2010/0070219 A1 | 3/2010 | Azancot et al. | |
| 2010/0127660 A1 | 5/2010 | Cook et al. | |
| 2010/0174629 A1 | 7/2010 | Taylor et al. | |
| 2010/0201312 A1 | 8/2010 | Kirby et al. | |
| 2010/0270970 A1 | 10/2010 | Toya et al. | |
| 2010/0290215 A1 | 11/2010 | Metcalf et al. | |
| 2011/0006603 A1 | 1/2011 | Robinson et al. | |
| 2011/0018360 A1 | 1/2011 | Baarman et al. | |
| 2011/0062916 A1 | 3/2011 | Farahani | |
| 2011/0074349 A1 | 3/2011 | Ghovanloo | |
| 2011/0089894 A1 | 4/2011 | Soar | |
| 2011/0156640 A1 | 6/2011 | Moshfeghi | |
| 2011/0184842 A1 | 7/2011 | Melen | |
| 2011/0199028 A1 | 8/2011 | Yamazaki et al. | |
| 2011/0211380 A1 | 9/2011 | Brown | |
| 2011/0241603 A1 | 10/2011 | Chang et al. | |
| 2011/0260532 A1 | 10/2011 | Tanabe | |
| 2012/0049642 A1 | 3/2012 | Kim et al. | |
| 2012/0235636 A1 | 9/2012 | Partovi | |
| 2012/0313577 A1 | 12/2012 | Moes et al. | |
| 2013/0005251 A1 | 1/2013 | Soar | |
| 2013/0038272 A1 | 2/2013 | Sagata | |
| 2013/0038280 A1 | 2/2013 | Boundy et al. | |
| 2013/0049682 A1 | 2/2013 | Niec et al. | |
| 2013/0075557 A1 | 3/2013 | Hsiao | |
| 2013/0093257 A1 | 4/2013 | Goto | |
| 2013/0106197 A1 | 5/2013 | Bae et al. | |
| 2013/0106353 A1 | 5/2013 | Foster | |
| 2013/0134794 A1 | 5/2013 | Lee et al. | |
| 2013/0169222 A1 | 7/2013 | Yoon et al. | |
| 2013/0234661 A1 | 9/2013 | Yang et al. | |
| 2013/0241735 A1 | 9/2013 | Nylen | |
| 2013/0257363 A1 | 10/2013 | Lota et al. | |
| 2013/0285601 A1 | 10/2013 | Sookprasong et al. | |
| 2013/0300355 A1 | 11/2013 | Jung | |
| 2013/0307468 A1 | 11/2013 | Lee et al. | |
| 2013/0314036 A1 | 11/2013 | Nakagawa | |
| 2013/0335005 A1 | 12/2013 | Ohama | |
| 2014/0015328 A1 | 1/2014 | Beaver et al. | |
| 2014/0035379 A1 | 2/2014 | Stevens et al. | |
| 2014/0035380 A1 | 2/2014 | Stevens et al. | |
| 2014/0084863 A1 | 3/2014 | Nakamura et al. | |
| 2014/0103732 A1 | 4/2014 | Irie et al. | |
| 2014/0132201 A1 | 5/2014 | Tsang | |
| 2014/0175895 A1 | 6/2014 | Ishi et al. | |
| 2014/0203662 A1 | 7/2014 | Bae | |
| 2014/0203770 A1 | 7/2014 | Salter et al. | |
| 2014/0210405 A1 | 7/2014 | Yang | |
| 2014/0225558 A1 | 8/2014 | Park | |
| 2014/0307439 A1 | 10/2014 | Chien | |
| 2015/0103458 A1 | 4/2015 | Liffring et al. | |
| 2015/0123483 A1 | 5/2015 | Leabman et al. | |
| 2015/0244199 A1 | 8/2015 | Chen | |
| 2017/0025886 A1 | 1/2017 | Rohmer et al. | |
| 2017/0273455 A1 | 9/2017 | Lukas | |

* cited by examiner

WIRELESS POWER STATIONS

CROSS REFERENCE TO RELATED APPLICATIONS

The present application is a continuation of U.S. application Ser. No. 14/637,036, filed Mar. 3, 2015, now abandoned, which claims priority to Provisional Application Ser. No. 61/947,178, filed Mar. 3, 2014, Provisional Application Ser. No. 61/954,322, filed Mar. 17, 2014, and Provisional Application Ser. No. 61/981,982, filed Apr. 21, 2014, each of which applications is hereby incorporated by reference in its entirety.

FIELD OF THE PRESENT DISCLOSURE

The present disclosure describes applications for wireless power transfer technology.

BACKGROUND OF THE PRESENT DISCLOSURE

Wireless transfer of electrical power using magnetic inductance technology is known and is already used in commercial applications such as chargers for electrical toothbrushes, and more recently, charging mats for smartphones and other personal electronic devices. However, this technology can be applied in new and innovative ways as further described in the present disclosure.

A new wireless power transfer technology known as magnetic resonance technology is emerging. Coils that act as transmitters and receivers for wireless power transmission using this technology are just starting to become commercially available. Magnetic resonance technology allows for power transfer through an air gap or through several inches of solid material, such as a wood tabletop. Because of this feature, magnetic resonance technology has commercial applications for which magnetic inductance technology is not suitable.

BRIEF SUMMARY OF THE PRESENT DISCLOSURE

According to the present disclosure, a power station may comprise a connection box including at least one electrical receptacle for powering or charging an electrical device and a wireless power transmitting assembly operatively connected to the connection box, the wireless power transmitting assembly adapted to transfer wireless power. A power cord may be connected to the connection box for supplying power to the connection box and the wireless power transmitting assembly.

According to embodiments, the power station may additionally comprise a securing mechanism for securing the power station to a surface.

According to embodiments, the wireless power transmitting assembly may be disposed inside a housing that is located remotely from the connection box.

According to embodiments, the power station may additionally comprise a mechanical adjusting device configured to allow a distance between a transmitter coil of the wireless power transmitting assembly and the surface to be changed.

According to embodiments, the power station may additionally comprise a locking mechanism adapted to secure the transmitter coil in a desired position once adjusted.

According to embodiments, the mechanical adjusting device may allow the entire wireless power transmitting assembly to be moved relative to the surface.

According to embodiments, the power station may additionally comprise an actuator that adjusts the position of the wireless power transmitting assembly for optimal transmission distance and strength based on a thickness and type of material of the surface.

According to embodiments, the power station may additionally comprise a second wireless power transmitting assembly located on a surface of the connection box.

According to embodiments, the second wireless power transmitting assembly may be an inductive charging pad mounted to a top surface of the connection box.

According to the present disclosure, a wireless power transmitting assembly may comprise a housing configured to be attached to the underside of a surface and a transmitter coil disposed within the housing and adapted to generate a wireless power field. A power supply may supply power to the transmitter coil, and a mechanical adjusting device may allow a distance between the transmitter coil and the surface to be changed to adjust a strength of the wireless power field at the surface.

According to embodiments, the mechanical adjusting device may attach the housing to the underside of the surface and may allow the entire housing to be moved relative to the surface.

According to embodiments, the wireless power transmitting assembly may additionally comprise an actuator associated with the housing for adjusting a position of the housing to optimize transmission distance and strength of the wireless power field based on a thickness and type of material of the surface.

According to embodiments, the wireless power transmitting assembly may additionally comprise a locking mechanism adapted to secure the transmitter coil in a desired position once adjusted.

According to embodiments, the mechanical adjusting device may be configured to allow the transmitter coil to move within an interior of the housing.

According to embodiments, the wireless power transmitting assembly may additionally comprise a locking mechanism adapted to secure the transmitter coil in a desired position once adjusted by preventing access to the interior of the housing.

According to embodiments, the wireless power transmitting assembly may additionally comprise a plurality of indications provided on the mechanical adjustment device indicating preferred positions of the transmitter coil for particular surface thicknesses.

According to the present disclosure, a power station may comprise a table having a top and at least one leg connected to the top. A receiver coil may be disposed in the at least one leg and configured to interoperate with a first transmitter assembly disposed beneath the at least one leg to conduct a wireless power transfer. The top of the table may include a power-providing section for powering or charging devices.

According to embodiments, the power station may include a second transmitter assembly for wireless transmitting power. The second transmitter assembly may include a transmitting coil located at the top of the table that is electrically connected to the receiver coil for receiving power therefrom.

According to embodiments, the power section may include at least one electrical receptacle for powering or charging a device through a wired connection.

According to an embodiment, the power station may additionally comprise a weatherproof pedestal housing the first transmitter assembly.

These and other objects, features and advantages of the present disclosure will become apparent in light of the detailed description of embodiments thereof, as illustrated in the accompanying drawings.

DETAILED DESCRIPTION OF THE DRAWINGS

As will be recognized by those of ordinary skill in the pertinent art, numerous changes and modifications may be made to the above-described embodiments of the present disclosure without departing from the spirit of the invention as defined in the appended claims. Accordingly, the particular embodiments described in this specification are to be taken as merely illustrative and not limiting.

Figure 1:
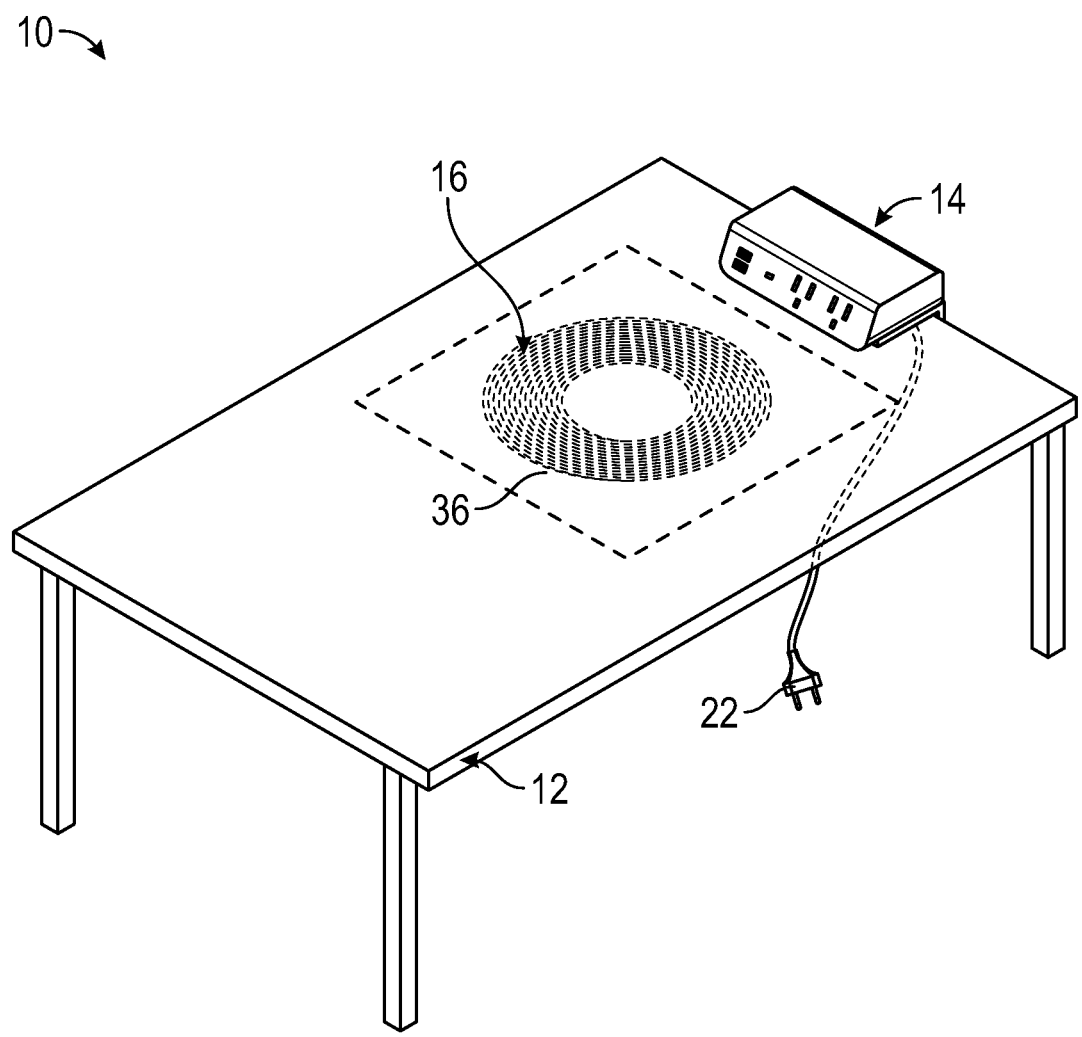
FIG. 1 shows a perspective view of a table with a power station according to a first embodiment of the present disclosure mounted to it.
Figure 2:
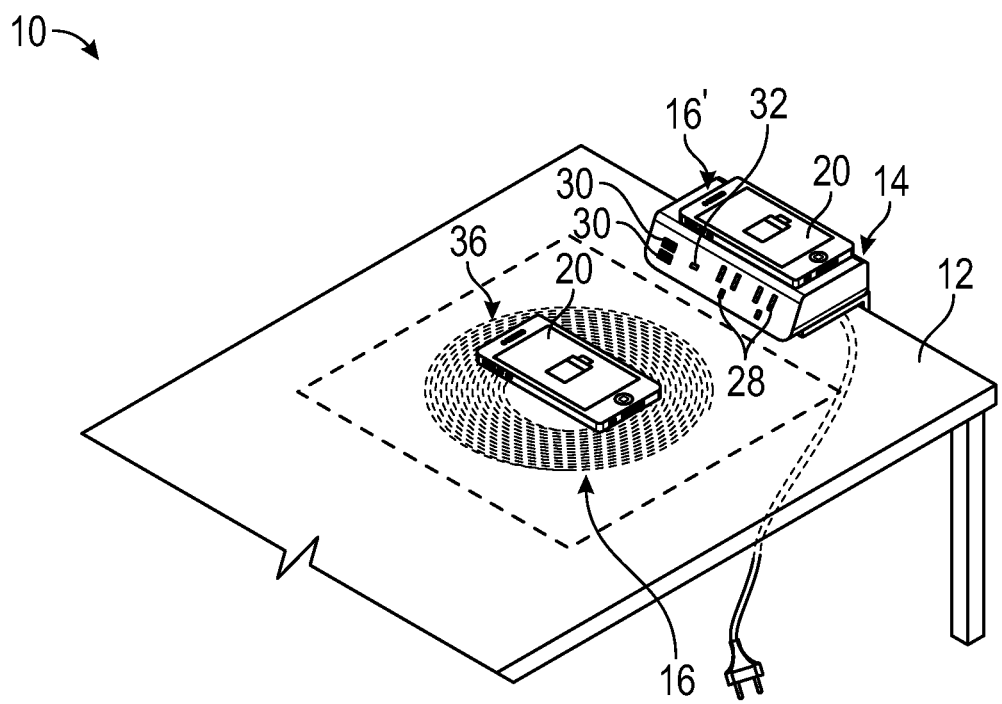
FIG. 2 shows an enlarged perspective view of the portion of the power station of FIG. 1 that is located above the table.
Figure 3:
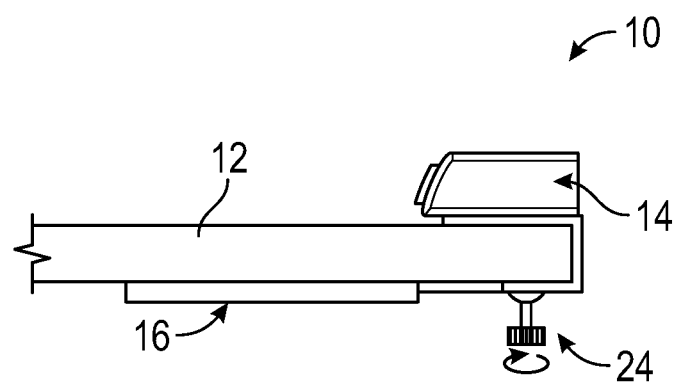
FIG. 3 shows a side view of a table with the attached power station according to FIG. 1 of the present disclosure mounted to it.

FIGS. 1-3 depict a first embodiment of the present disclosure. Referring to FIGS. 1 and 2, a power station 10 that is mounted to a table 12 includes a connection box 14. The connection box 14 includes a plurality of ordinary power receptacles 28 and USB receptacles 30 to supply power to electrical devices. The box 14 can also include one or more indicators 32, for example an LED that indicates whether the receptacles are powered. The power station also includes a wireless power transmitting assembly 16 located under the table for charging items such as, for example, cell phones or tablets 20, that are placed on top of the table 12. Wireless power transmitting assembly 16 can be of a type that transfers wireless power through the thickness of the table 12 using magnetic resonance technology so that it can charge devices placed on the top surface of the table. The power station further includes a wireless power transmitting assembly 16' located at the top portion of the connection box 14 for wireless charging items placed on the top surface of the connection box. Wireless power transmitting assembly 16' can be an inductive charging pad that is mounted to the top surface of the connection box 14. Alternatively, wireless power transmitting assembly 16' can be a transmitting assembly that uses magnetic resonance technology, in which case the assembly can be mounted inside of the housing of the connection box 14. The power station 10 also includes a power cord 22 for providing power to the power station 10. As shown in FIG. 3, the power station 10 also includes a securing mechanism 24 for attaching the connection box 14 to the table. The securing mechanism 24 can take the form of, for example, a clamp, bracket, or screws. The wireless power transmitting assembly 16 is located inside of a housing that is connected to the rest of the charging station through, for example, an extension arm. One advantage of power station 10 is that both wireless power transmitting assembly 16 and receptacles 28 and 30 can both be powered through power cord 22.

Figure 4:
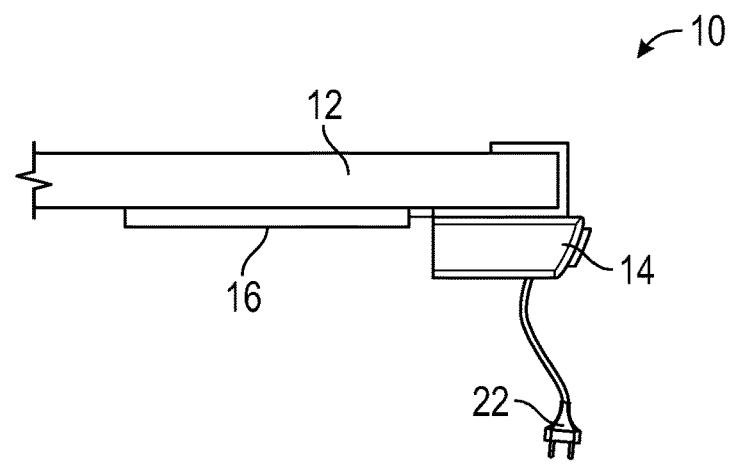
FIG. 4 shows a side view of a table with the power station of FIG. 1 in an alternative mounting configuration.

FIG. 4 depicts an alternative mounting configuration for the power station 10 shown in FIGS. 1-3. The alternative mounting configuration is similar to the first embodiment shown in FIGS. 1-3, except that in the mounting configuration shown in FIG. 4 the connection box 14 is mounted to the table so that it extends downward from a bottom edge of the table (instead of a top edge of the table). The receptacles in the box 14 may be positioned at various locations on the connection box 14 to facilitate use of the receptacles. For example, the receptacles may face away from the table instead of towards the table to facilitate easy access, may face inward underneath the table to act as a convenience receptacle for other equipment mounted under the table, and/or may be positioned about the connection box 14 at any other suitable location. In this embodiment, the top surface of the table is unobstructed.

The power station 10, shown in FIGS. 1-4, can advantageously serve as a transition to a purely wireless tabletop power setup from a setup that accommodates both wirelessly charged devices and legacy devices that are not yet capable of, for example, being charged wirelessly since the connection box 14 may be mounted in either orientation. The connection box 14 could, for example, be first mounted above the table, as shown in FIGS. 1-3, to service a user's wired legacy devices but then, as the user's equipment is replaced with all wirelessly charging versions over time such that the receptacles are not needed above the table, the same connection box 14 could be switched/relocated to the underside of the table, as shown in FIG. 4.

Figure 5:
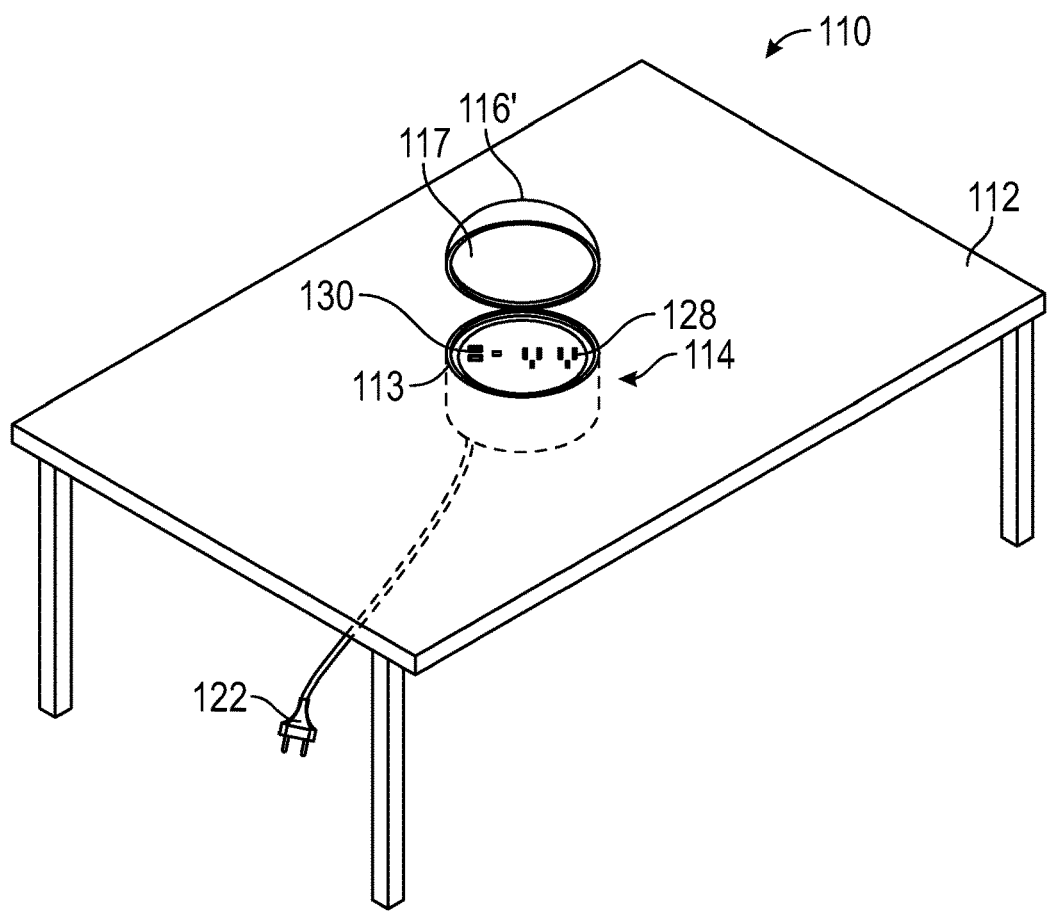
FIG. 5 shows a perspective view of a table with a power station according to a second embodiment of the present disclosure mounted to it.

FIG. 5 depicts a second embodiment of the present disclosure, wherein like numerals represent like elements. In this embodiment, a power station 110 having a connection box 114 with a cover 117 is mounted in a hole 113 in a table 112 such that when the cover 117 is closed its top surface is nearly flush with the top surface of the table 112. Receptacles, such as power receptacles 128 and/or USB receptacles 130 are included inside the connection box 114 to supply power to electrical devices. The receptacles can be recessed or at or near to the top of the connection box 114. The cover 117 includes a wireless power transmitting assembly 116. The wireless power transmitting assembly 116 may be in the form of an inductive charging pad mounted to the top surface of the cover 117 or it may be in the form of a magnetic resonance transmitting coil (and associated hardware) that is at least partially incorporated inside the cover 117 or is mounted to its inner surface. A power cord having a plug 122 provides power to the power station 110 and, thus, the receptacles inside the connection box 114 and/or the wireless power transmitting assembly 116, when the plug is connected to an ordinary 110/120V outlet. The power station 110 of FIG. 5 advantageously allows for the charging of both wirelessly charged devices and legacy devices that are not yet capable of being charged wirelessly.

Figure 6:
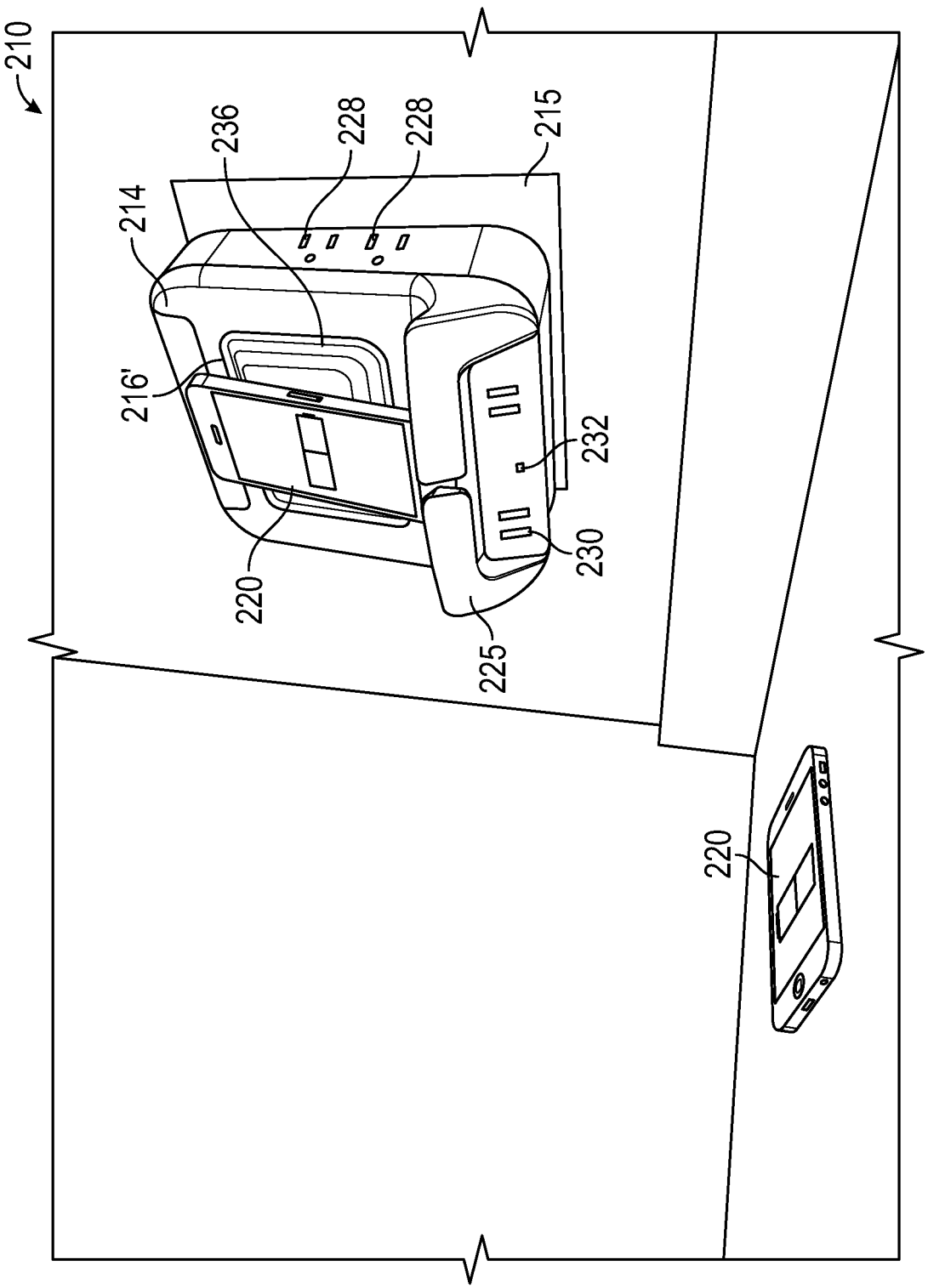
FIG. 6 shows a plug-in power station according to a third embodiment of the present disclosure.

FIG. 6 depicts a third embodiment of the present disclosure. A power station 210 includes a plug-in module 214 that has terminals (not shown) on its back surface for plugging into an ordinary 110/120V power outlet 215. The plug-in module 214 includes ordinary electrical receptacles 228 and USB receptacles 230. The plug-in module can also include other forms of receptacles and/or status indicators, shown schematically and identified by reference numeral 232, for making a power (or data) connection or for providing information regarding operation of the power station 210. The plug-in module 214 also includes a wireless power transmitter assembly 216 for providing wireless power to devices 220, such as, for example, cell phone or a tablet. The wireless power transmitter assembly 216 could take the form of an inductive wireless charging pad mounted to the front face of module 214. Alternatively, the wireless power transmitter assembly 216 could take the form of a transmitter coil (and associated hardware) that uses magnetic resonance technology to transmit wireless power, in which case the assembly could be mounted to the front face of module 214 or inside the housing for module 214 behind its front face. The plug-in module 214 also includes a shelf 225 for supporting the device or multiple devices 220. As such, the wireless power transmitter assembly 216 can wirelessly charge a suitable device 220, i.e., a device containing hardware that allows it to be charged by wireless power transmitter assembly 216, that is resting on shelf 225. In embodiments, the module 214 of power station 210 may contain a magnetic resonance wireless power transmitter assembly that emanates a magnetic field pattern that is capable of supplying wireless power to a receiver assembly inside a device in close proximity to the module 214, such as a device 220' resting on a nearby portion of table 212.

Figure 7:
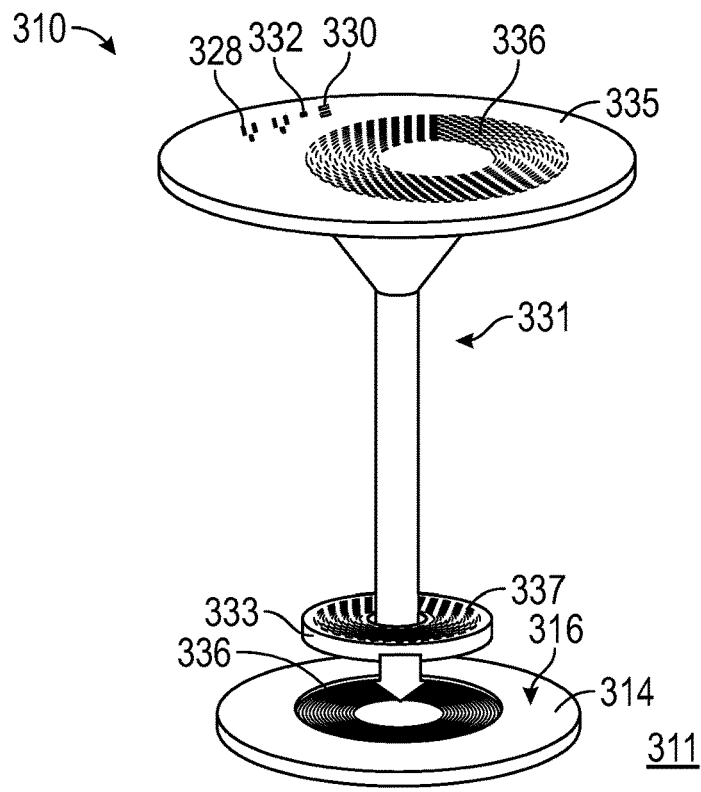
FIG. 7 discloses a wirelessly powered pedestal according to a fourth embodiment of the present disclosure.

FIG. 7 depicts a fourth embodiment of the present disclosure. FIG. 7 shows a wireless power transmitter assembly 316 that is disposed outdoors in the ground or indoors in a floor (both ground and floor indicated by reference numeral 311). The wireless power transmitter assembly 316 can be part of a floor box or pedestal 314 disposed on or within the floor or ground 311. The wireless power transmitter assembly 316 includes a transmitting coil 336 installed at or below the adjacent ground/floor surface in a suitable (e.g. weatherproof) enclosure with a power source. A removable column 331 includes a base 333 and a top 335. The base 333 contains a wireless power receiver coil 337 that can interoperate with transmitting coil 336 to conduct a wireless power transfer. The base 333 can be placed on top of the wireless power transmitter assembly 316 to provide safe weatherproof transmission of power higher up in the column 331 (for various functions) to the top 335. The top 335 may include various plug-in power receptacles such as ordinary electrical receptacles 328 and USB receptacles 330 that receive power from wireless power receiver coil 337. The top 335 may also include one or more indicators 332, for example, an LED that indicates that the receptacles are powered. The top 335 may also include its own wireless power transmitter assembly having transmitting coil 336 that receives power from wireless power receiver coil 337 and can wirelessly transfer power to an appropriate receiver assembly (not shown) in an electrical device such as a smartphone, tablet, etc.

Figure 8:
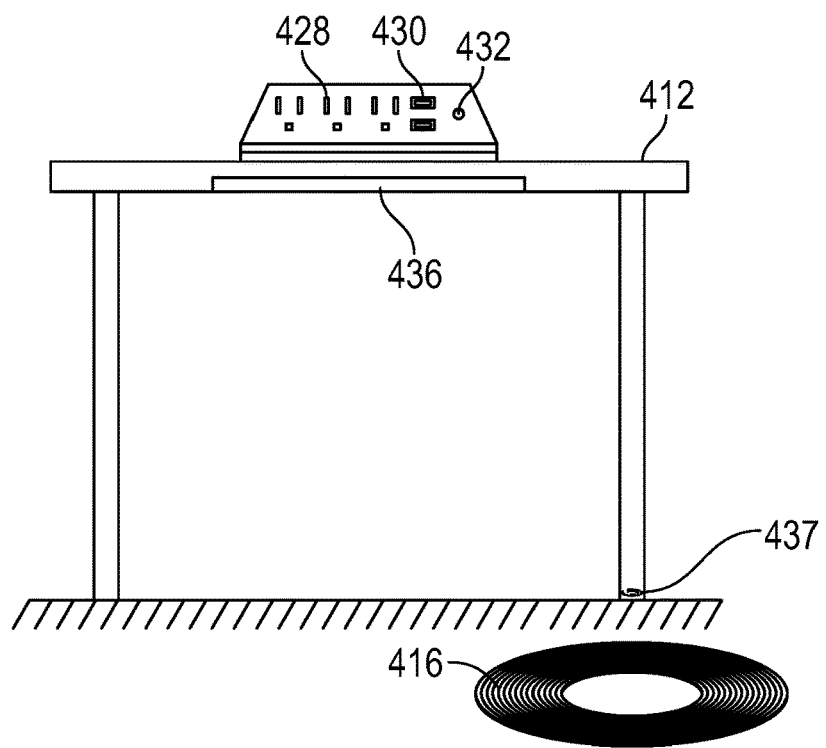
FIG. 8 discloses a wirelessly powered table according to a fifth embodiment of the present disclosure.

FIG. 8 depicts a fifth embodiment of the present disclosure. The embodiment shown in FIG. 8 is similar to the embodiment shown in FIG. 7 and operates in substantially the same manner. The difference is that, in the embodiment of FIG. 8, a receiver coil 437 is located at the end of one leg of a four-legged table 412 instead of base 333 of column 331. The receiver coil 437 receives power from a wireless power transmitter assembly 416 that is disposed outdoors in the ground or indoors in a floor in substantially the same manner as in the embodiment of FIG. 7. The power may then be provided to various plug-in power receptacles of the four-legged table 412, such as ordinary electrical receptacles 428, USB receptacles 430, other receptacles 432, and/or a second wireless power transmitter assembly having transmitting coil 436 for wireless power transfer to a compatible receiver in an electrical device such as a smartphone, tablet, etc. in substantially the same manner discussed in connection with the embodiment of FIG. 7.

Figure 9:
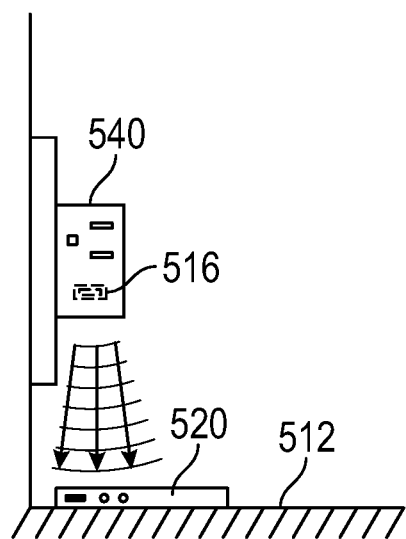
FIG. 9 discloses a pop-out outlet that contains a wireless power transmission assembly according to a sixth embodiment of the present disclosure.

FIG. 9 depicts a sixth embodiment of the present disclosure. In the embodiment shown in FIG. 9, a wireless power transmitting assembly 516 is integrated into a pop-out electrical outlet 540. One example of a pop-out outlet with electrical receptacles is disclosed in U.S. Pat. No. 8,684,755, which is assigned to The Wiremold Corporation and is hereby incorporated by reference in its entirety. The wireless power transmitting assembly 516 installed inside a pop-out outlet 540 can be configured such that the magnetic field it emanates is capable of wirelessly providing power to a receiver device 520, such as a smartphone, tablet, or the like, that is located on, for example, a table or floor surface 512 below the outlet 540. In embodiments, when the pop-out outlet 540 is recessed within the wall, the wireless transmitting assembly 516 may not be able to power or charge any devices 520 due to the range of the magnetic field emanated by the wireless transmitting assembly 516 and, in some embodiments, the pop-out outlet 540 may act as a switch that deactivates the wireless transmitting assembly 516 when the pop-out outlet 540 is recessed within the wall. In other embodiments, the wireless transmitting assembly 516 may advantageously be able to power or charge devices 520 even when the pop-out outlet 540 is recessed within the wall.

Figure 10:
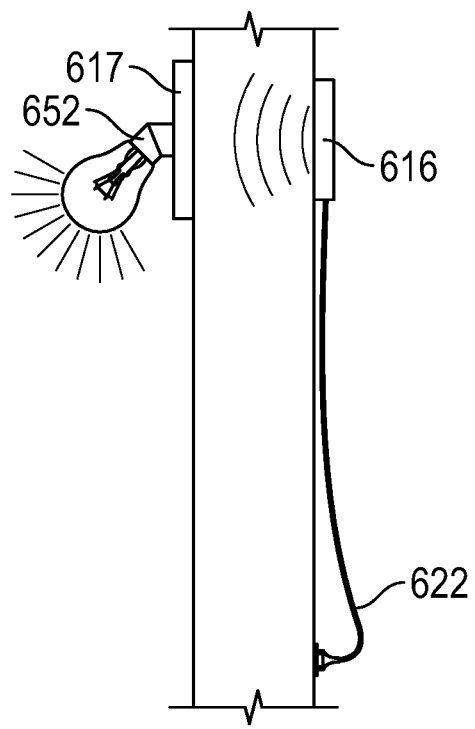
FIG. 10 discloses a configuration for wirelessly powering an electrical device mounted to the exterior of a building according to a seventh embodiment of the present disclosure.

FIG. 10 depicts a seventh embodiment of the present disclosure. In the embodiment shown in FIG. 10, a wireless magnetic resonance power transmitting assembly 616 is mounted on the inside surface of an exterior building wall 650. The assembly 616 can be powered using cord and plug 622 or may be hardwired into the buildings electrical system. An electrical device 652 requiring power may be mounted to the opposite side of the exterior wall 650. Examples for the electrical device 652 include a light, a camera, an intercom system, a speaker, or any other electrical device that is commonly mounted to the outside of a building. The electrical device includes a magnetic resonance power receiving coil 617 that can receive electrical power transmitted by the wireless magnetic resonance power transmitting assembly 616. As such, the electrical device can be powered without having to route electrical wires from inside the building to the device 652, which can be expensive, and without having to route a power cord to the electrical device 652, which can be inconvenient if there are no outdoor outlets available and also involves increased shock hazards due to exposed plug terminals or cord wires that get wet in the rain.

Figure 11:
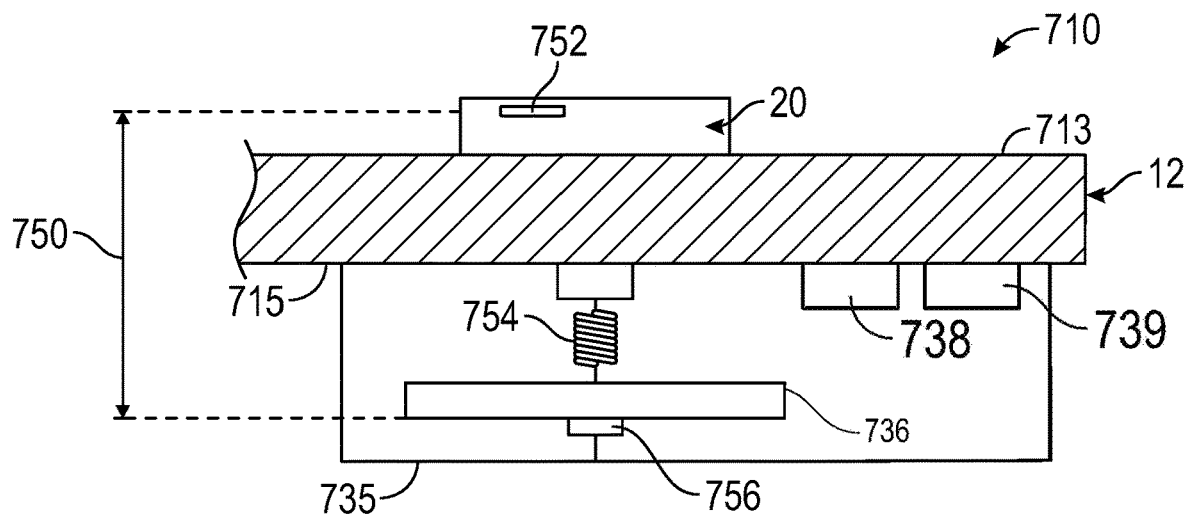
FIG. 11 shows an embodiment for providing adjustability and tuning to the power station of FIG. 1.
Figure 12:
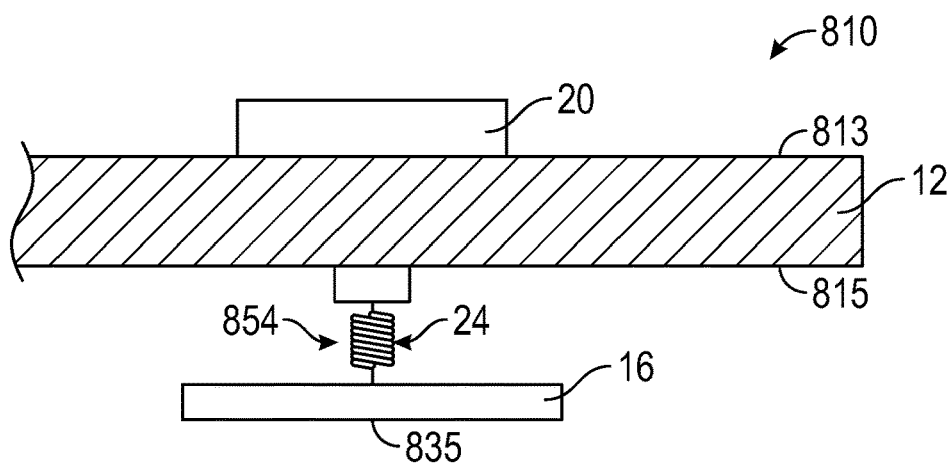
FIG. 12 shows an embodiment for providing adjustability and tuning to the power station of FIG. 1.
Figure 13:
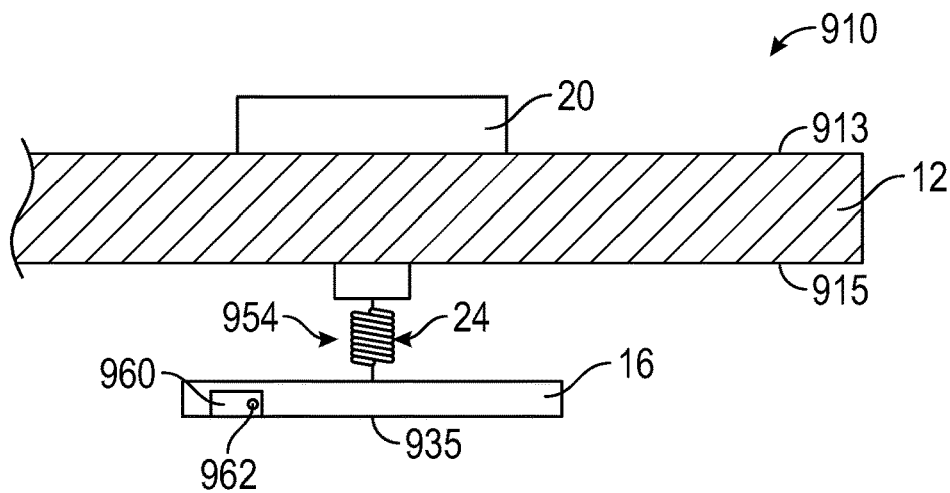
FIG. 13 shows an embodiment for providing adjustability and tuning to the power station of FIG. 1.

FIGS. 11-13 show embodiments for providing adjustability and tuning to wireless portions of power stations used with tables, desks, countertops, or the like, such as the power station 10 having wireless power transmitting assembly 16 of FIGS. 1-4.

As discussed in connection with FIGS. 1-4, the wireless power transmitting assembly 16, such as a magnetic resonant wireless power transmitter, is mounted beneath, or on the underside of, a surface (such as a table, desk, countertop, etc.) and provides wireless power to a compatible receiver in a device 20 (such as a phone, tablet, laptop, etc. containing a compatible receiver) on or above the surface 12 through the thickness of the material composition of the surface 12. For best performance, the transmitter's output should be optimized, or tuned, to the thickness of surface's material, for example to have the transmitting field strength highest at the location of the receiver in device 20 on the surface 12. Tuning may be achieved by electronically adjusting the transmitter's power output to best compensate for the known surface structure configuration, or alternatively the surface thickness can be adjusted (for example by forming a pocket to locally reduce the thickness of the surface at the location where the transmitter is mounted) to match the transmitter's preferred thickness.

The embodiments shown in FIGS. 11-13 provide a more flexible and cost effective means of accommodating a variety of surface thicknesses by mechanically adjusting the height of the transmitter of the wireless power transmitting assembly 16 relative to the upper face of the surface 12 where the receiver in a device 20 will or may reside.

Referring to FIG. 11, the wireless portion 16 includes a transmitter enclosure 735 for housing a transmitter coil 736, power supply 738, and circuit board 739 therein. The table or surface 12 includes a top surface 713 and an underside surface 715.

In one embodiment, the enclosure 735 is fixedly mounted to underside 715 of the subject surface 12 and the relevant power transmitting hardware's position can be vertically adjusted within the enclosure to vary the height of the optimal transmitter/receiver power transfer interaction near the upper face of the surface 12. Thus, while the enclosure 735 is fixedly attached to the surface 12, the coil 736 is adjustable within the enclosure 735 to set the optimal transmission distance 750 between the transmitter coil 736 and a receiver 752 disposed within the device 20. While the position of the transmitter coil 736 is adjustable within the enclosure, the position of other components, such as the power supply 738 and circuit board 739 may or may not be adjustable within the enclosure 735. The transmitter coil 736 can be adjusted by various mechanical adjusting devices 754, such as a threaded rod or the like, and can also include a locking mechanism 756 to ensure that the transmission distance cannot be easily reset once set to a desired position. The locking mechanism 756 may advantageously preclude either accidental resetting or resetting by unauthorized persons and may include either a tool for adjusting the transmitter distance 750 or other similar mechanism to preclude tampering.

Referring to FIG. 12, in another embodiment for providing adjustability and tuning to wireless portions of power stations, the entire enclosure 835 is movable and adjustable with respect to the surface 12 via an adjusting device 854, such as a threaded rod or the like. The enclosure 835 may advantageously be a thinner device and the adjusting device 854 may be disposed outside the enclosure 835 and substantially between the enclosure 835 and the surface 12. The securing device 24, shown in FIG. 3, may be the same or a different device from the adjusting device 854.

Referring to FIG. 13, in a further embodiment for providing adjustability and tuning to wireless portions of power stations, the wireless portion 16 includes a calibrating mechanism 960 to initially determine an optimal transmission distance. The calibrating mechanism includes a sensor 962 to detect for optimal transmission distance and strength based on the thickness of material of the table/surface 12 and based on the type of material for table/surface 12 as both properties may affect the transmission of wireless power. The wireless portion 16 may also include a feedback to indicate the optimal adjustment position. The adjustment device 954 may include an actuator that adjusts the position of the wireless portion 16 based on information from the sensor 962 and/or feedback. Additionally, indications may be provided on adjustment device 954 to indicate the preferred position corresponding to particular surface thicknesses (e.g. ½ inch, 1 inch, 1.5 inches, 2 inches). Also, the adjustment may advantageously be fixed at any point along the available distance of vertical travel of enclosure 935 to accommodate a range of surface thicknesses.

In the embodiments of FIGS. 11-13, the adjustability may be accomplished via a variety of mechanical means such as linkages, slides, flexible supports (e.g. springs), cams, gear trains, etc. while the locking may also be accomplished via a variety of means such as cams, levers, spring loaded lateral pressure/detents, threaded fasteners, etc.

These embodiments advantageously provide flexible and cost effective means of accommodating a variety of surface thicknesses by mechanically adjusting the height of the transmitter of the wireless power transmitting assembly relative to the upper face of the surface 12 where receivers in devices 20 will or may reside.

Although the invention has been shown and described with respect to exemplary embodiments thereof, it should be understood by those skilled in the art that various changes, omissions, and additions may be made thereto, without departing from the spirit and scope of the invention.

What is claimed is:

1. A power station comprising:
    a housing mountable to a table, the housing having a top surface defining a charging surface;
    a wireless power transmitter configured to generate a first wireless charging field at the charging surface;
    a wireless power transmitting assembly external to the housing and operatively connected thereto, the wireless power transmitting assembly adapted to be positioned on an underside of the table and to generate a second wireless charging field at an upper surface of the table; and
    a power cord configured to connect the housing to a power outlet to provide power to the wireless power transmitter and the wireless power transmitting assembly;
    wherein the wireless power transmitting assembly is coupled to the housing by a securing device that provides adjustability to the second wireless charging field.

2. The power station according to claim 1, wherein the top surface forms a shelf configured to hold a device being charged by the first wireless charging field.

3. The power station according to claim 1, further comprising at least one USB receptacle formed through the housing and operatively connected to the power cord.

4. The power station according to claim 1, further comprising at least one ordinary electrical receptacle formed through the housing and operatively connected to power cord.

5. The power station according to claim 1, wherein the wireless power transmitter includes an inductive wireless charging pad forming the charging surface.

6. The power station according to claim 1, wherein the wireless power transmitter includes a transmitter coil disposed within the housing.

7. A power station comprising:
a housing including a top surface defining a charging surface and a bottom surface configured to mount the housing to a table;
a wireless power transmitter associated with the housing and configured to generate a first wireless charging field at the charging surface;
a wireless power transmitting assembly external to the housing and operatively connected thereto, the wireless power transmitting assembly adapted to be positioned on an underside of the table and to generate a second wireless charging field at a portion of an upper surface of the table; and
a power cord configured to connect the housing to a power outlet to provide power to the wireless power transmitter and the wireless power transmitting assembly;
wherein the wireless power transmitting assembly is coupled to the housing by a securing device that provides adjustability to the second wireless charging field.

8. The power station according to claim 7, wherein the top surface forms a shelf configured to support a device being charged by the first wireless charging field.

9. The power station according to claim 8, further comprising at least one USB receptacle formed through the housing below the shelf, the at least one USB receptacle operatively connected to the power cord.

10. The power station according to claim 7, further comprising at least one USB receptacle formed through the housing and operatively connected to the power cord.

11. The power station according to claim 7, wherein the wireless power transmitter includes an inductive wireless charging pad at the charging surface.

12. The power station according to claim 7, wherein the wireless power transmitter includes a transmitter coil disposed within the housing.

13. A power station comprising:
a housing comprising a first surface defining a charging surface and a second surface configured to support the housing on a table;
a wireless power transmitter associated with the housing and configured to generate a first wireless charging field at the charging surface;
a wireless power transmitting assembly external to the housing and operatively connected thereto, the wireless power transmitting assembly adapted to be positioned on an underside of the table and to generate a second wireless charging field at an upper surface of the table; and
a power cord configured to connect to a power outlet to provide power to the wireless power transmitter and the wireless power transmitting assembly;
wherein the wireless power transmitting assembly is coupled to the housing by a securing device that provides adjustability to the second wireless charging field.

14. The power station according to claim 13, wherein the first surface forms a shelf configured to support a device.

15. The power station according to claim 14, further comprising at least one USB receptacle formed through the housing below the shelf, the at least one USB receptacle configured to receive power from the power cord.

16. The power station according to claim 15, further comprising at least one indicator disposed on the housing, the at least one indicator providing a visual indication of whether or not the at least one USB receptacle is powered.

17. The power station according to claim 14, further comprising at least one ordinary electrical receptacle formed through the housing below the shelf, the at least one ordinary electrical receptacle configured to receive power from the power cord.

18. The power station according to claim 17, further comprising at least one indicator disposed on the housing, the at least one indicator providing a visual indication of whether or not the at least one ordinary electrical receptacle is powered.

19. The power station according to claim 13, wherein the wireless power transmitter includes an inductive wireless charging pad forming the charging surface.

20. The power station according to claim 13, wherein the wireless power transmitter includes a transmitter coil disposed within the housing.

\* \* \* \* \*